(12) United States Patent
Gundotra et al.

(10) Patent No.: US 9,183,515 B2
(45) Date of Patent: Nov. 10, 2015

(54) SHARE BOX FOR ENDORSEMENTS

(75) Inventors: Vivek Paul Gundotra, Los Gatos, CA (US); David Glazer, Woodside, CA (US); Evan Gilbert, Oakland, CA (US); David Mark Byttow, San Francisco, CA (US); Garry Boyer, Sunnyvale, CA (US); Aron Giles, San Francisco, CA (US); Jonathan Terleski, Mountain View, CA (US); Brett Rolston Lider, San Francisco, CA (US); Daniel Wesley Dulitz, Los Altos Hills, CA (US); Matthew Allen Gundersen, Danville, CA (US)

(73) Assignee: Google Inc., Mountain View, CA (US)

(*) Notice: Subject to any disclaimer, the term of this patent is extended or adjusted under 35 U.S.C. 154(b) by 113 days.

(21) Appl. No.: 13/590,966

(22) Filed: Aug. 21, 2012

(65) Prior Publication Data

US 2013/0055089 A1  Feb. 28, 2013

Related U.S. Application Data

(60) Provisional application No. 61/526,235, filed on Aug. 22, 2011.

(51) Int. Cl.
*G06F 3/048* (2013.01)
*G06Q 10/00* (2012.01)
(Continued)

(52) U.S. Cl.
CPC .............. *G06Q 10/00* (2013.01); *G06F 3/0481* (2013.01); *G06F 8/20* (2013.01); *G06F 8/34* (2013.01); *G06F 9/4443* (2013.01); *H04L 67/06* (2013.01)

(58) Field of Classification Search
CPC ....... G06F 3/0481; G06F 9/4443; G06F 8/20; G06F 8/34; H04L 67/06
USPC .................... 709/204, 206; 705/14.53, 14.72; 707/738; 455/419; 715/751, 753, 733, 715/749, 748, 719–726, 854–855, 762–763, 715/734–737, 744–747, 204, 206
See application file for complete search history.

(56) References Cited

U.S. PATENT DOCUMENTS 6,130,938 A   10/2000  Erb
6,192,119 B1   2/2001  Wilson
(Continued)

FOREIGN PATENT DOCUMENTS

WO   WO02079984   10/2002
WO   WO2008014268   1/2008

OTHER PUBLICATIONS

Adamic et al., "A Social Network Caught in the Web," Internet Journal, First Monday, Jun. 2, 2003, vol. 8, No. 6, pp. 1-22.
(Continued)

*Primary Examiner* — Steven Sax
(74) *Attorney, Agent, or Firm* — Patent Law Works LLP

(57) ABSTRACT

In one aspect, a system for presenting a share box with content information in response to an endorsement includes an endorsement sharing module that is responsive to user input and creates a sharing box having content derived from the user context and input request. The endorsement sharing module receives a user request to share information. In response, this endorsement sharing module determines the context of the user, retrieves content based on the context, filters the content based on publisher information, personalizes the share box content, and adds the content to a share box. The endorsement sharing module also adds one or more actions to the share box after which the share box is provided for display to the user.

22 Claims, 9 Drawing Sheets

(51) Int. Cl.
    G06F 9/44      (2006.01)
    G06F 3/0481    (2013.01)
    H04L 29/08     (2006.01)

(56) References Cited

U.S. PATENT DOCUMENTS

| | | | |
|---|---|---|---|
| 6,697,478 | B1 | 2/2004 | Meldrum et al. |
| 6,754,322 | B1 | 6/2004 | Bushnell |
| 6,957,398 | B1* | 10/2005 | Nayeri ................... 715/867 |
| 7,106,848 | B1 | 9/2006 | Barlow et al. |
| 7,333,943 | B1 | 2/2008 | Charuk |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 7,885,856 | B1 | 2/2011 | Berger et al. |
| 8,166,069 | B2* | 4/2012 | Sample et al. ............... 707/783 |
| 8,355,955 | B1* | 1/2013 | Mirchandani et al. ....... 705/26.1 |
| 8,650,398 | B2* | 2/2014 | Nagai et al. ................. 713/168 |
| 8,719,251 | B1* | 5/2014 | English et al. ............... 707/713 |
| 2002/0137490 | A1 | 9/2002 | Gallant |
| 2002/0143874 | A1 | 10/2002 | Marquette et al. |
| 2002/0156862 | A1 | 10/2002 | Zhou |
| 2004/0258220 | A1 | 12/2004 | Levine et al. |
| 2005/0152521 | A1 | 7/2005 | Liljestrand |
| 2005/0216550 | A1* | 9/2005 | Paseman et al. ............. 709/202 |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0010343 | A1* | 1/2008 | Escaffi et al. ................. 709/204 |
| 2008/0056475 | A1 | 3/2008 | Brannick et al. |
| 2008/0140849 | A1* | 6/2008 | Collazo ......................... 709/229 |
| 2008/0192656 | A1 | 8/2008 | Vagelos |
| 2008/0255939 | A1* | 10/2008 | Harmon et al. ................ 705/14 |
| 2009/0070249 | A1* | 3/2009 | Leach et al. .................... 705/37 |
| 2009/0240771 | A1* | 9/2009 | Capobianco ................... 709/204 |
| 2010/0088180 | A1* | 4/2010 | Ventilla et al. .............. 705/14.53 |
| 2010/0131296 | A1 | 5/2010 | Knutson |
| 2010/0306249 | A1* | 12/2010 | Hill et al. ..................... 707/769 |
| 2010/0332404 | A1* | 12/2010 | Valin ............................. 705/310 |
| 2011/0010656 | A1* | 1/2011 | Mokotov ...................... 715/780 |
| 2011/0098156 | A1 | 4/2011 | Ng et al. |
| 2012/0010932 | A1* | 1/2012 | Satyavolu et al. ......... 705/14.17 |
| 2012/0084160 | A1* | 4/2012 | Badros et al. ............. 705/14.73 |
| 2012/0110515 | A1* | 5/2012 | Abramoff et al. ............. 715/854 |
| 2012/0209850 | A1* | 8/2012 | Kikin-Gil et al. ............. 707/738 |
| 2012/0221479 | A1* | 8/2012 | Schneck et al. ............... 705/347 |
| 2012/0278166 | A1* | 11/2012 | Badros et al. ............. 705/14.53 |
| 2012/0303722 | A1* | 11/2012 | Richter et al. ................ 709/206 |
| 2013/0024273 | A1* | 1/2013 | Stark et al. ................ 705/14.43 |
| 2013/0073473 | A1* | 3/2013 | Heath ........................... 705/319 |
| 2015/0161256 | A1* | 6/2015 | Jeh |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

(56) References Cited

OTHER PUBLICATIONS

Like Button—Facebook Developers, Internet, retrieved at http://developers.facebook.com/docs/reference/plugins/like/, Sep. 26, 2012, 4 pgs.

Share Plugin—LinkedIn Developer Network, Internet, retrieved at http://developer.linkedin.com/share-plug, Sep. 26, 2012, 1 pg.

European Search Report, Application No. 12005994.4, Oct. 31, 2012, 8 pgs.

* cited by examiner

SHARE BOX FOR ENDORSEMENTS

CROSS REFERENCE TO RELATED APPLICATIONS

This application claims priority under 35 USC §119(e) to U.S. Application No. 61/526,235, entitled "Share Box for Endorsements" filed Aug. 22, 2011, the entirety of which is incorporated herein by reference.

BACKGROUND

The present disclosure relates to user interfaces for sharing and commenting on content. In particular, the present disclosure relates to a share box for sharing or commenting on published content, content in a stream from a social network, or search results from a search engine.

The popularity and use of the Internet, web browsers, social networks and other types of electronic communication have grown in recent years. While users may have once operated their computing devices with a single browser showing a single webpage, new ways for delivering and engaging with information such as videos, news articles, Web blogs and activities on social networks have been developed. More recently, much of the content on the World Wide Web can be commented upon or endorsed by users. Users can indicate they endorse, approve or like something by clicking an endorsement button or link associated the particular Web content or object to be endorsed. It is common for many users to have multiple windows open at a given time viewing different content, and is cumbersome and inefficient to require the user to transition between different interfaces or windows to undertake action such as endorsing particular content.

SUMMARY

According to one innovative aspect of the subject matter in this disclosure, a system for generating and presenting a sharing user interface is described. The system includes a sharing request module for receiving and processing a request for a sharing interface, the sharing request module coupled to receive the request for the sharing interface from a client device and coupled to provide the sharing interface including customized content to the client device, the sharing request module also performing an action on customized content; a user interface creation module for creating the sharing interface including customized content using context and an endorsement, the user interface creation module coupled to the client device to received context and to provide the sharing interface to the client device; a content and context retrieval module for retrieving content and determining the context for information that is added to the sharing interface, the content and context retrieval module generating the customized content by processing the retrieved content, the content and context retrieval module coupled to the user interface creation module to provide the customized content and a content source from which to retrieve the content; and a transfer module for transferring the customized content in the sharing interface in response to user selection of a share button, the transfer module coupled to receive the customized content and send the customized content.

In general, another innovative aspect of the subject matter described in this disclosure may be embodied in methods that include: receiving input from a user; determining a context of the user and the input; retrieving content based on the context; adding the content to a sharing interface; adding an action button to the sharing interface; and providing the sharing interface for display.

Other implementations of one or more of these aspects include corresponding systems, apparatus, and computer programs, configured to perform the actions of the methods, encoded on computer storage devices.

These and other implementations may each optionally include one or more of the following features. For instance, the features include: the input is a selection of an endorsement button or a cursor over the endorsement button; determining a context of the user and the input includes determining a uniform resource locator corresponding to an endorsement button; a selection of the action button causes the added content to be shared; filtering the content based at least in part on a publisher input; the publisher input is a semantic classification including a type and a property; personalizing the content based at least in part on user identity; adding the action to the sharing interface includes adding a field to input recipients of a sharing action; receiving additional content for the sharing interface and sharing the additional content and the content added to the sharing interface.

For instance, the operations further include: receiving additional input from the user; determining an action associated with the additional input; and performing the action associated with the additional input on the content in the sharing interface.

BRIEF DESCRIPTION OF THE DRAWINGS

The disclosure is illustrated by way of example, and not by way of limitation, in the figures of the accompanying drawings in which like reference numerals are used to refer to similar elements.

DETAILED DESCRIPTION

A system for presenting a sharing interface (e.g., a share box) with content or information in response to an endorsement input is described. Throughout this application the term "sharing interface" and "share box" will be used interchangeably and it should be understood that the interface could take forms other than a box. The system includes an endorsement sharing module that is responsive to a user request to share/endorse and creates a share box having content derived from the user context and input. The endorsement sharing module receives a user request to share information. In response, this endorsement sharing module determines the context of the user, retrieves content based on the context, filters the content based on publisher information, personalizes the content based upon the identity of the user, and adds the content to a share box. One or more actions with regard to the content in the share box and corresponding buttons are also added to the share box. The share box, injected with content and share action options, is then presented or displayed to the user. The user can add content and then select a share action option and the information in the share box is delivered to other systems. In some embodiments, the information is shared to a third party side, to a social network associated with the user, to an endorsement server, or to a search server. The present disclosure also includes a method for presenting a sharing interface, collecting content and context and sending that information. The present disclosure also includes a method for interacting with the shared content generated from the sharing interface.

Figure 1:
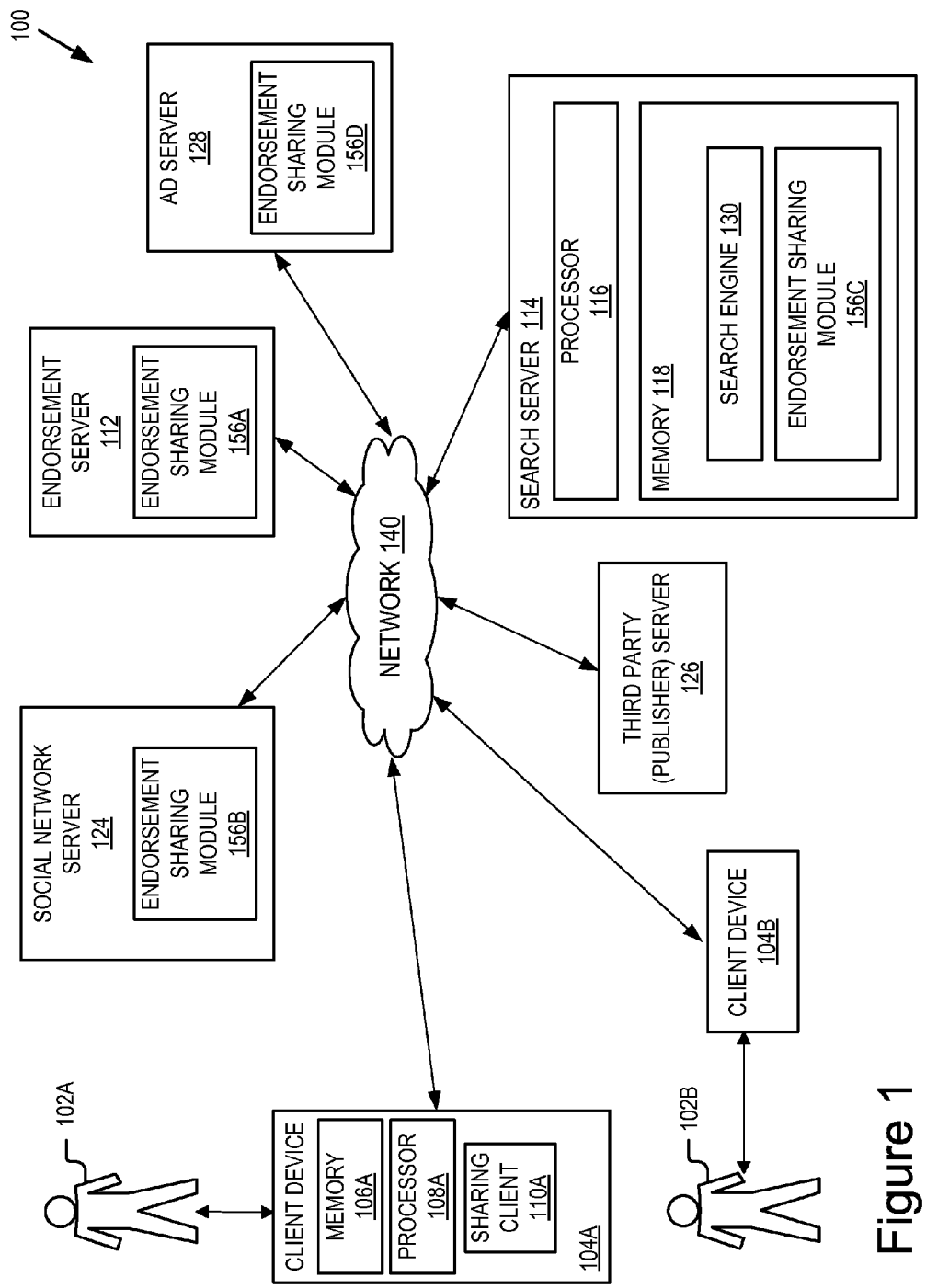
FIG. 1 is a block diagram illustrating a system for generating a sharing interface and sharing content according to an embodiment of the present disclosure.

FIG. 1 illustrates an embodiment of a system 100 for presenting a sharing interface (e.g., a share box) with context and information in response to an endorsement. The system 100 comprises one or more client devices 104A, 104A, a network 140, an endorsement server 112, a search server 114, a social network server 124, a third party server 126 and an advertising (AD) server 128. The client device 104A is utilized by a user 102A to input a request to retrieve information from: (1) the third party server 126, (2) the search server 114 or (3) to receive a stream of data from the social network server 124. The client device 104A is coupled for communication with the network 140 which in turn is coupled for communication with the endorsement server 112, the search server 114, the social network server 124, and the third party server 126.

Although two users 102A, 102B (also referred to herein individually and collectively as 102) and two client devices 104A, 104B (also referred to herein individually and collectively as 104) are illustrated, any number of client devices 104 can be available to any number of users 102. Furthermore, while only one network 140 is coupled to the client devices 104, the endorsement server 112, the search server 114, the social network server 124 and the third party server 126, in practice any number of networks 140 can be connected to the system 100. Additionally, while only one endorsement server 112, search server 114, social network server 124, and third party server 126 are respectively shown, the system 100 could include one or more endorsement servers 112, search servers 114, social network servers 124, and third party servers 126. Moreover, while the present disclosure is described below primarily in the context of content from third party servers 126, search results and streams from a social network server 124, the present disclosure is applicable to any type of online communications with multiple data sources and multiple data types.

The client device 104A comprises a memory 106A, a processor 108A and a sharing client 110A (also referred to herein individually and collectively as 110). The client devices 104A, 104B, for example, may be a personal computer, a laptop computer, a tablet computer, a mobile phone (e.g., a smart phone) or any other computing device. Although not shown in FIG. 1, it should be understood that client device 104B may include a memory 106, a processor 108, and a sharing client 110 with the same or similar functionality described below for the client device 104A.

The memory 106 stores instructions and/or data that may be executed by the processor 108. The memory 106 is coupled for communication with the other components. The instructions and/or data may comprise code for performing any and/or all of the techniques described herein. The memory 106 may be a dynamic random access memory (DRAM) device, a static random access memory (SRAM) device, a flash memory or some other memory device.

The processor 108 comprises an arithmetic logic unit, a microprocessor, a general purpose controller or some other processor array to perform computations and provide electronic display signals to a display device. The processor 108 is coupled to a bus for communication with the other components. Processor 108 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. Other processors, operating systems, sensors, displays and physical configurations are possible.

The sharing client 110 is software or routines operable on the client device 104 for performing some or all of the operations for creating and displaying a sharing interface (e.g., a share box). The sharing client 110 also receives and processes input from the user 102. The sharing client 110 also processes and sends the contents of the share box in response to user selection of actions or buttons associated with content in the share box. For example, the sharing client 110 is a plug-in to a web browser 202 (see FIG. 2). In one embodiment, the sharing client 110 accepts inputs from the user 102, sends the inputs to the endorsement sharing module 156, displays a share box, and sends inputs related to the share box to the endorsement sharing module 156, but the endorsement sharing module 156 is primarily responsible for processing and generating the share box. Such an embodiment is well suited for applications where the client device 104 is a smart phone with limited computational power. In another embodiment, the sharing client 110 performs some or all of the processing steps that will be described below as being performed by the endorsement sharing module 156. For example, in addition to receiving input from the user 102 and generating displays for presentation to the user 102, the sharing client 110 may create the share box, populate the share box with content, filter the content in the share box, personalize the content in the share box, and in response to user input share or distribute the content of the share box to other systems. In still another embodiment, individual steps of the method described below may be divided between the sharing client 110 and the endorsement sharing module 156 in a variety of different ways.

The client device 104 is configured for communication with the network 140. In response to user input, the client device 104 generates and sends a request to the network 140. The network 140 receives and passes the request on to the endorsement server 112, the search server 114, or the social network server 124 depending on the type of request. A response is generated by the endorsement server 112, the search server 114, or the social network server 124 depending on the type of request. The response may be a web page, search results, a stream from a social network or other content. This content is displayed on the client device 104 to the user 102. The content will also include one more endorsement buttons generated by the endorsement server 112. The user can endorse the content or portions of it by selecting an endorsement button.

The network 140 can be wired or wireless, and may have any number of configurations such as a star configuration, token ring configuration or other configurations. Furthermore, the network 140 may comprise a local area network (LAN), a wide area network (WAN) (e.g., the Internet), and/or any other interconnected data path across which multiple devices may communicate. In some embodiments, the network 140 may be a peer-to-peer network. The network 140 may also be coupled to or include portions of a telecommunications network for sending data in a variety of different communication protocols. In some embodiments, the network 140 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc.

The search server 114 comprises a processor 116 and a memory 118. The processor 116 is similar to the processor 108 described above; however, it may have increased computing capability. The memory 118 is similar to the memory 106 described above; however, it may be larger in size, have faster access time, and also include volatile and nonvolatile memory types.

In some embodiments, the memory 118 stores a search engine 130 and an endorsement sharing module 156C. The search engine 130 is operable on the processor 116 to receive the query signal and in response return search results. The search engine 130 collects, parses, indexes and stores data to facilitate information retrieval. The search engine 130 also processes search queries and returns search results from the data sources that match the terms in the search query. The search engine 130 also ranks search results based upon relevance to the user. The search engine 130 also formats and sends the search results via the network 140 to the client device 104. In one embodiment, the search engine 130 is coupled for communication with the endorsement sharing module 156C to modify the ranking of the search results based on input signals from the endorsement sharing module 156C.

The endorsement sharing module 156 is software or routines that are responsive to user input and generate the sharing interface (e.g., share box) as will be described below with reference to FIGS. 3-6. Although FIG. 1 shows multiple endorsement sharing modules 156A, 156B, 156C and 156D (also referred to herein individually and collectively as 156), it should be recognized that only a single endorsement sharing module 156 is required according to the present disclosure. That endorsement sharing module 156 may be part of the endorsement server 112, the search server 114, the social network server 124 or the AD server 128. The endorsement sharing module 156 regardless of which server 112, 114, 124 and 128 it is part of cooperates with the sharing client 110 of the client device 104. In some embodiments, multiple endorsement sharing modules 156A, 156B, 156C and 156D cooperate with each other to provide the functionality as described below with reference to FIGS. 3-6.

In some embodiments, the endorsement sharing module 156C is operable as part of the search server 114 and is coupled to receive the context of information presented to the user 102 by the search engine 130. The endorsement sharing module 156C is also coupled to communicate with the endorsement server 112 to receive information related to endorsement of a particular piece of content. In some embodiments, the endorsement sharing module 156C is also coupled for communication with the social network 124 to receive the context of information presented to the user 102 by the social network server 124. The endorsement sharing module 156C is coupled to receive other types of information such as information about a user's social graph, information about user interaction with the social network 124, user interaction with a video sharing site, or any other system with which a user may interact such as but not limited to micro-blogs, comments, votes (e.g., indicating approval of particular content), other indications of interest (e.g., that promote content for consumption by other users), playlists (e.g., for video or music content) and the like. In some implementations, users can be provided options to opt-in or opt-out of having this type of information being used. The present disclosure will be described below in the context of endorsement of search results; however, the principles and concepts of the disclosed technologies can be applied to any other type of content such as web content or resources, social network information, or micro blogs, posts, etc. The present disclosure will also be described below (See FIGS. 2A, 2B and 2C) in an example where the endorsement sharing module 156 is operable as part of the endorsement server 112 but this is merely by way of example and the endorsement sharing module 156 may be part of the endorsement server 112, the search server 114, the social network server 124 or the AD server 128 as noted above.

In some embodiments, the endorsement sharing module 156C receives social information from the social network server 124, endorsement information from the endorsement server 112 or video or multimedia information from a multimedia server (not shown) and uses that information to modify the ranking of search results. For example, the ranking of the search results may be modified based on whether any of the user's contacts as determined from the social network have reviewed the results. In another example, the ranking of the search results may be modified based on whether any other user has endorsed a search result or more particularly whether any other contacts of the user have endorsed a search result. Still further, the ranking of the search results may be modified using information from video or multimedia information from a multimedia server.

In some embodiments, the social network server 124 is coupled to the network 140. The social network server 124 also includes a social network software/application (not shown). Although only one social network server 124 is shown in detail, it should be recognized that multiple social network servers 124 may be present. A social network is any type of social structure where the users are connected by a common feature. The common feature includes relationships/connections, e.g., friendship, family, work, an interest, etc. The common features are provided by one or more social networking systems, such as those included in the system 100, including explicitly-defined relationships and relationships implied by social connections with other online users, where the relationships form a social graph. In some examples, the social graph can reflect a mapping of these users and how they are related. Furthermore, it should be understood that social network server 124 and social network software/application are representative of one social network and that there are multiple social networks coupled to the network 140, each having its own server, application and social graph. For example, a first social network is more directed to business networking, a second is more directed to or centered on academics, a third is more directed to local business, a fourth is directed to dating and others of general interest or a specific focus. Furthermore, the social network server 124 may provide personalized streams of content including photos, posts, shares, and other information from a variety of sources including friends, colleagues, news sources, etc.

As shown in FIG. 1, in one embodiment, the endorsement sharing module 156B operates as part of the social network server 124. This embodiment of the endorsement sharing module 156B has the same functionality as has been described above for the endorsement sharing module 156C that is part of the search server 114. The endorsement sharing module 156B generates and populates a share box in response to user requests. The endorsement sharing module 156B obtains the context of the user from the social network server 124. The endorsement sharing module 156B also communicates with the endorsement server 112 and the search server 114 to retrieve other contextual information. This information is used by the endorsement sharing module 156B to filter and personalize the content.

An endorsement server 112 comprises a processor (not shown) and a memory (not shown). The processor is similar to the processor described above; however, it may have increased computing capability. The endorsement server 112 also includes software or routines operable on the server to implement the endorsement system. In one embodiment, the endorsement server 112 is a system for tracking content and indicating users who have endorsed or recommended existing content. In some embodiments, the endorsement or recommendation system implemented by the endorsement server 112 is applicable to information available on the World Wide Web. In some embodiments, the endorsement or recommendation system is applicable to content created by users of the social network. In some embodiments, the endorsement or recommendation system is applicable to content such as videos available over the Internet. The endorsement server 112 is coupled to receive endorsements from the user, coupled to receive search results, and coupled to provide endorsement information to the endorsement sharing modules 156. In one embodiment, the endorsement server 112 includes the endorsement sharing module 156A. The endorsement sharing module 156A has the same or similar functionality to the endorsement sharing modules 156B, 156C described above with reference to the social network server 124 and the search server 114, respectively.

In some embodiments, the advertising (AD) server 128 is coupled to the network 140. The AD server 128 includes software and routines for serving ads in response to queries for search results from the search server 114 or on web sites from the third party server 126. The AD server 128 stores advertisements used in online marketing and delivers them to website visitors such as sponsored links or display ads. Depending on the embodiment, the AD server 128 works in concert with the search server 114 or functions independently. Although only one AD server 128 is shown in detail, it should be understood that multiple AD servers 128 may be present. In some embodiments, the AD server 128 also includes an endorsement sharing module 156D. The endorsement sharing module 156D works as part of the AD server 128 to return ads to client device 104 as part of the content populated to the share box, and targeted ads are selected (1) based on the context used to determine the additional content to return to the user, or (2) based on the additional content itself to be returned to the user. In some embodiments, the endorsement sharing module 156D cooperates with the AD server 128 to return ads to other locations on the page where the endorsement is taking place, but outside of the share box itself. In some embodiments, the endorsement sharing module 156D works with the AD server 128 to return ads with the shared content once the endorsing user has completed its own addition to the share box and sends the ad and shared content for sharing to other locations (social network, blog, etc.). In this case, the ad may appear as content alongside the shared content or on other portions of the landing page for the shared content.

The third party server 126 is coupled to the network 140 to provide content such as web pages. In one embodiment, the third party server 126 is the Web server of a publisher. The third party server 126 includes a processor and a memory and serves web pages in response to a HTTP requests. Although only a single third party server 126 is shown, it should be recognized that there may be hundreds or even thousands of third-party servers 126 providing different content.

Figure 2A:
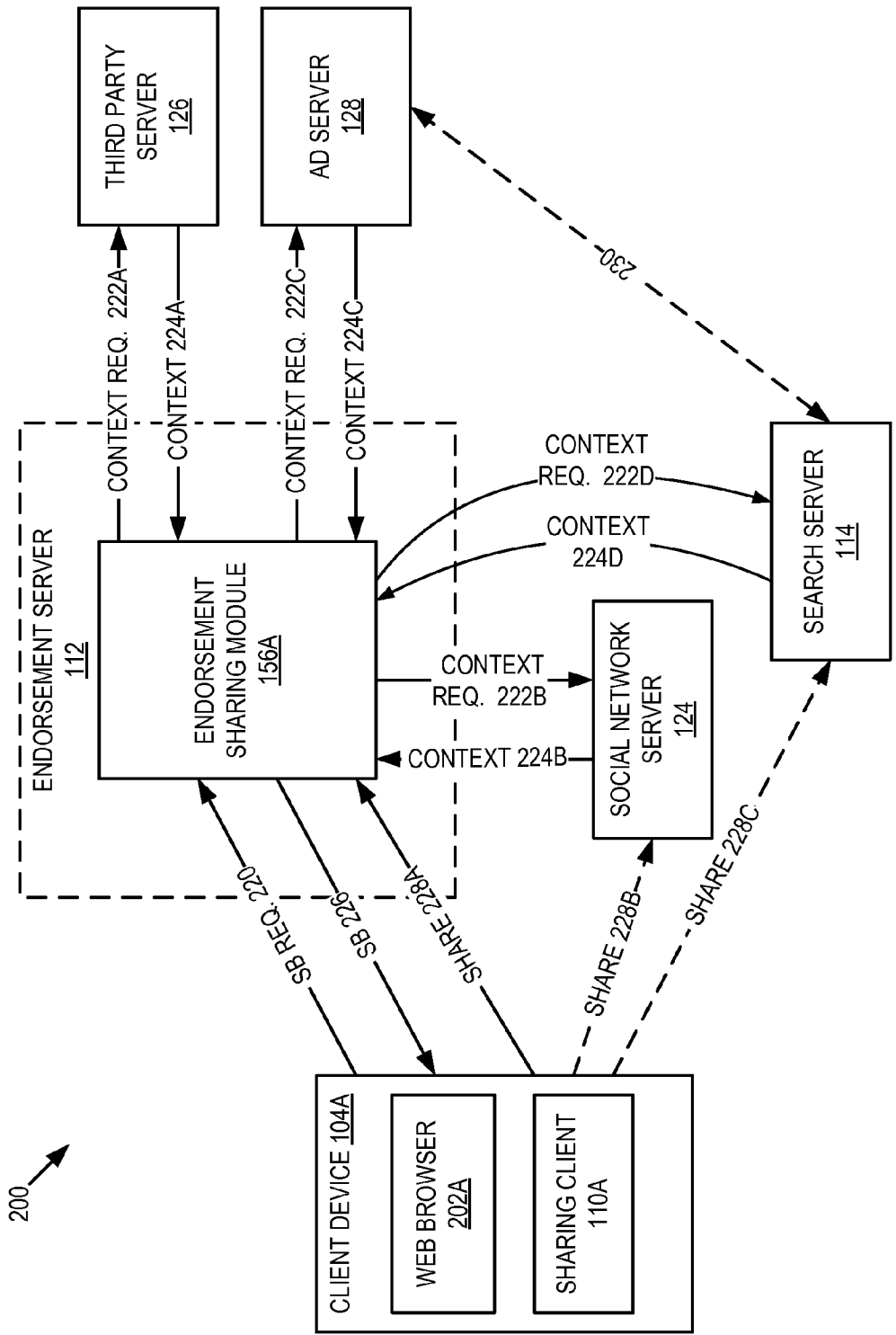
FIG. 2A is a block diagram illustrating portions of the system generating the sharing interface and sharing content according to some embodiments of the present disclosure.

Referring now to FIG. 2A, one embodiment 200 of the system 100 is shown. FIG. 2A shows portions of the system 100 with the relationship between the client device 104A, the endorsement server 112, the search server 114, the social network server 124, the third party server 126 and the AD server 128. It should be understood that in some embodiments, the endorsement sharing module 156 could be part of the social network server 124 or the search server 114 rather that part of the endorsement server 112 as depicted in FIG. 2A by way of example. In such embodiments, the endorsement sharing module 156B would cooperate with components of the social network server 124 in a similar manner to that shown in FIG. 2A. In some embodiments, the endorsement sharing module 156C could be part of the search server 114 and communicate with the endorsement server 112 or the social network server 124. In some embodiments, the endorsement sharing module 156D is part of the AD server 128 and communicates with the endorsement server 112, the search server 114 or the social network server 124.

FIG. 2A illustrates the signals that are sent between the client device 104, the endorsement server 112 (in particular, the endorsement sharing module 156A), the search server 114, the social network server 124, the third party server 126 and the AD server 128 to create a sharing interface (e.g., share box) and share content in that share box with other systems. It should be understood that the endorsement sharing module 156A is representative of any endorsement sharing module 156 and that a system with an endorsement sharing module 156B only in the social network server 124, an endorsement sharing module 156C only in the search server 114 or an endorsement sharing module 156D only in the AD server 128 would operate in a similar manner.

The user 102 and the client device 104 cooperate so that content is displayed by the client device 104. For example, a webpage is retrieved from the third party server 126, a stream is retrieved from the social network server 124 or search results are retrieved from the search server 114 and presented on a display of the client device 104. The user 102 inputs a signal requesting a share box or a sharing interface. The client device 104 sends a share box request signal 220 to the endorsement sharing module 156A. The endorsement sharing module 156A processes the share box request signal 220 and creates a share box or sharing interface. The endorsement sharing module 156A determines the identity of the user and the context in which the request for the share box was made so that this context can be used to determine what content to automatically insert into the share box. In some embodiments, the endorsement sharing module 156A sends a context request signal 222A to the third party server 126. The third party server 126 responds by providing the context 224A. In this case, providing the context 224A is performed by sending information about the webpage (or even the actual web page, or a link to the webpage) that was provided to the client device 104. In some embodiments, the endorsement sharing module 156A sends a context request signal 222B to the social network server 124. The social network server 124 responds by sending the context 224B. In this case, the context 224B includes the content being viewed by the user 102 such as a stream of content, a post, a blog, a photo, social graph, etc. In some embodiments, the endorsement sharing module 156A sends a context request signal 222C to the AD server 128. The AD server 128 responds by sending the context 224C. In this case, the context 224C includes ads or links appropriate for the context. The AD server 128 may also received other context information from the social network server 124, the third party server 126, the endorsement sharing module 156A or search server 114 to better define the context and thereby better target the ads sent to match the context for maximum effectiveness. The AD server 128 may receive this information directly from the social network server 124, the third party server 126, the endorsement sharing module 156A or the search server 114 as shown by representative signal line 230 shown with dashes since this information also may be provided via the endorsement sharing module 156A. In some embodiments, the endorsement sharing module 156A sends a context request signal 222D to the search server 114. The search server 114 responds by sending the context 224D in which the search box request 220 was made. For example, the search server 114 may deliver the search results being viewed by the user when the search box for's quest signal was made by the user. The endorsement sharing module 156A receives the context 224A, 224B, 224C or 224D from the third party server 126, the social network server 124, the AD server 128 or the search server 114, respectively, and uses that context 224A, 224B, 224C or 224D to determine what information to include within the share box. This process will be described in more detail below with reference to FIG. 3 and can include filtering information based on publisher information from the third party server 126, filtering information based on user preference information from the social network server 124, the search server 114 or third party server 126, or other types of personalization of the content for the user. The endorsement sharing module 156A then creates the share box including the content and the actions that can be taken on the content and sends 226 the share box to the client device 104. The endorsement sharing module 156A may also deliver ad content as part of the share box or along with the share box as has been described above. The share box (and/or add content) is received by the sharing client 110A and presented to the user 102 on the web browser 202A. The user 102 may add content to the share box. Included within the share box are a number of actions or buttons that are selectable by the user 102. The user 102 may choose to share the content in the share box to any number of other server systems or take any other actions on the content in the share box. Three examples of potential actions are shown in FIG. 2A. First, the content in the share box may be shared/sent back 228A to the endorsement sharing module 156A. In some embodiments, this is preferred and the information stored at the endorsement server 112 or passed along to the search server 114, the social network server 124, the third party server 126 or the AD server 128 as appropriate. Second, the content in the share box may be shared/sent back 228B to the social network server 124 for sharing with friends or circles of the user 102. Third, the content in the share box may be shared/sent back 228C to the search server 114 for use in improving the operation of the search engine 130. The second and third examples are optional and therefore shown with dashed lines in FIG. 2A. Although not shown, the content in the share box may also be shared with other systems such as but not limited to micro blogging sites, bulletin boards, video hosting sites, blogs, forums, etc.

While FIG. 2A describes one embodiment in which most of the operations of the present disclosure are performed by the endorsement sharing module 156A, it should be recognized that in some embodiments, some or all the steps described above may be performed by the sharing client 110. In such a case, the sharing client 110 processes the share box request 220, generates the share box, communicates with the third party server 126 and/or the social network server 124 to request and receive context, determines the content for the share box based upon the context and provides the share box with injected content for presentation by the web browser 202. The sharing client 110 also receives input from the user regarding actions to take on the content and performs those actions such as sharing 228A, 228B, 228C with other systems.

Figure 2B:
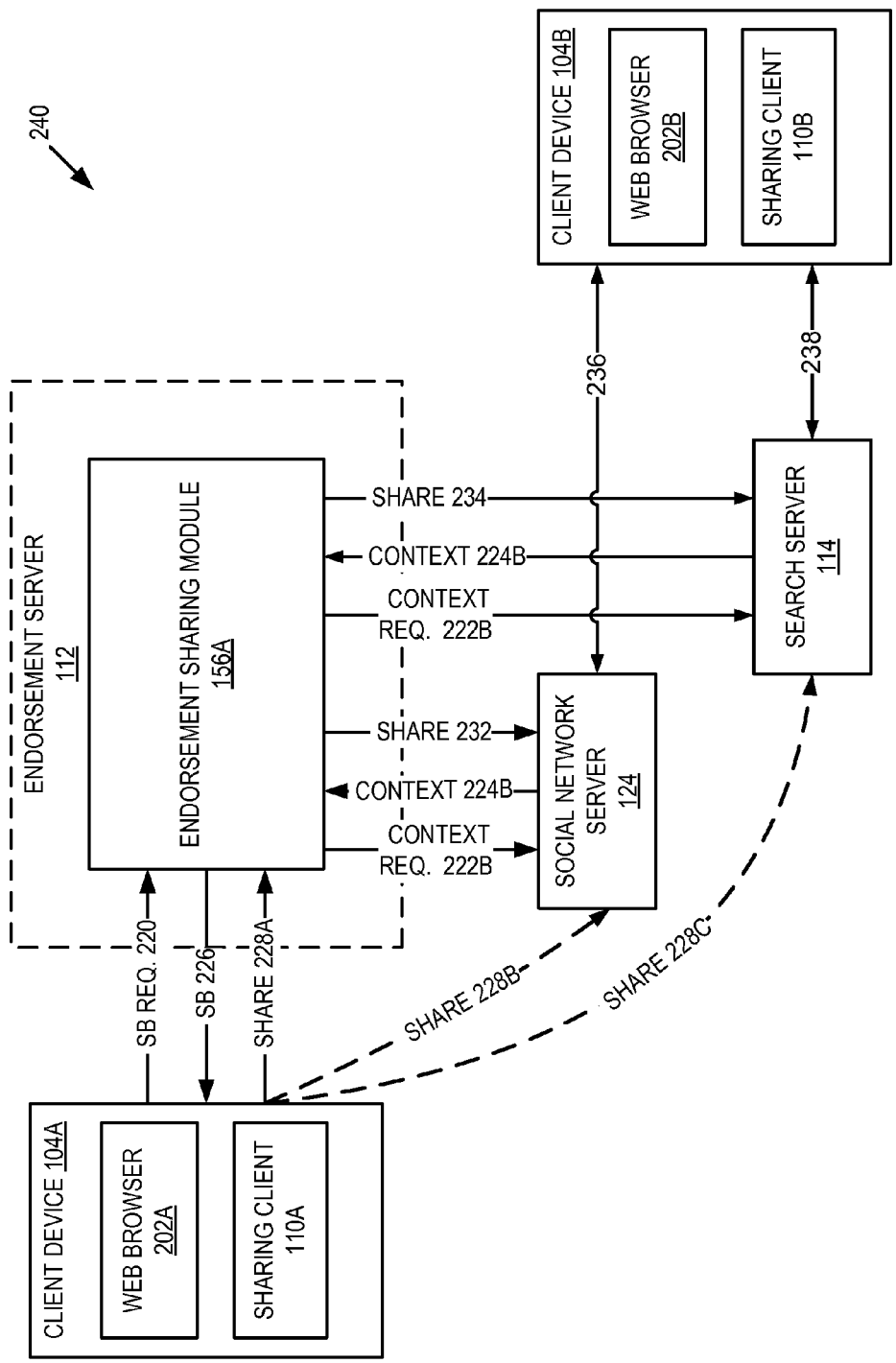
FIG. 2B is a block diagram illustrating portions of the system generating a sharing interface and sharing content system according to some embodiments of the present disclosure.

Referring now to FIG. 2B, the user interaction, the shared content and the signals that are sent between the endorsement server 112 and client devices 104A, 104B are described in more detail. FIG. 2B illustrates an example of portions 240 of the system 100 and the communications for using the share box to share content from client device 104A and then to interact with the shared content using client device 104B. The portions 240 of the system 100 shown in FIG. 2B include the client device 104A, the endorsement server 112, the social network server 124, the search server 114 and the client device 104B. It should be understood that these portions 240 you are merely used by way of example to demonstrate how content is shared using the share box and then interacted with. Other embodiments of the system 100 may include other servers (e.g., 126 or 128) and the sharing client 110A may function similarly to share content, and those other servers may cooperate with the sharing client 110B to allow interaction with the shared content by the client device 104B.

The configuration and interaction of the client device 104A with the endorsement server 112, in particular the endorsement sharing module 156A, has been described above with reference to FIG. 2A. The client device 104A and the endorsement server 112 operate in a similar manner in this embodiment. Thus, similar reference numbers and names have been used for components and signals with the same or similar functionality. For example, the client device 104A generates the share box request and sends 220 it to the endorsement sharing module 156A. In response, the endorsement sharing module 156A generates the share box, retrieves 222, 224 the content and context, populates the share box with content, adds action buttons to the share box and sends 226 the share box to the client device 104A. The share box is presented to the user, the user interacts with the share box; and in response to user input, content (e.g., comments, posts, videos, pictures, or other context metadata) are shared 228. More specifically, the shared content and context are sent 228A from the sharing client 110A to the endorsement sharing module 156. As noted above, in some embodiments (and thus shown with dashed lines) the sharing client 110A sends 228B, 228C the shared content and context directly to the social network server 124 or the search server 114.

One notable difference not depicted in FIG. 2A that is shown in FIG. 2B, is that the endorsement sharing module 156A is used to send shared content and context to the social network server 124 and the search server 114. In some embodiments, the endorsement sharing module 156A includes shared information storage 256 (see FIG. 2C) and stores the shared content and context. The endorsement sharing module 156A stores the shared content and context and then sends 232, 234 it to the social network server 124 and the search server 114. In some embodiments, the shared content and context is sent to the social network server 124 and the search server 114 immediately. In some embodiments, it is sent on a periodic basis. This allows the social network server 124 and the search server 114 to add the shared content and context to other information that they process and present to the user. In particular, the client device 104B can be used by another user to access content from a social network or perform a search. The client device 104B includes the web browser 202B and a sharing client 110B with similar functionality as that described above for the web browser 202A and sharing client 110A with reference to FIG. 2A. The client device 104B is coupled 236 for cooperation with the social network server 124 for example, via the network 140. The client device 104B retrieves and presents shared content to the user (not shown). The client device 104B and the social network server 124 are advantageously able to customize the shared content for the user as will be described below with reference to FIG. 7. Similarly, the client device 104B cooperates 238 with the search server 114 and the search results may be modified in rank or include shared content. Again, an example of a process for the client device 104B to interact with the search server 114 using the shared content and context will be described below with reference to FIG. 7.

Figure 2C:
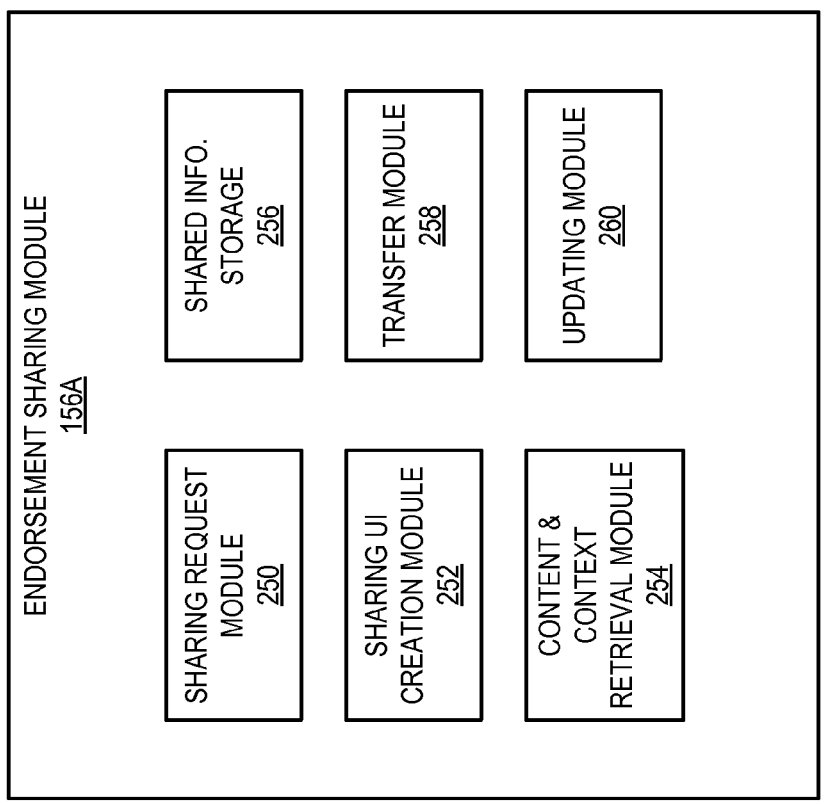
FIG. 2C is a block diagram illustrating an endorsement sharing module according to an embodiment of the present disclosure.

Referring now to FIG. 2C, an embodiment of the endorsement sharing module 156A is shown. The endorsement sharing module 156A may include a sharing request module 250, a sharing user interface (UI) creation module 252, a content and context retrieval module 254, a shared information storage 256, a transfer module 258, and an updating module 260. Although not shown in FIG. 2C, it should be understood that the endorsement server 112 may include a processor and memory upon which these modules 250, 252, 254, 256, 258, 260 are operable.

The sharing request module 250 may be software or routines for receiving and processing a request for a share box or sharing interface. The sharing request module 250 is coupled or configured for communication with the client device 104A and receives a request for a share box 220. In some embodiments, the sharing request module 250 also acts as a controller to implement the processes described below with reference to FIG. 3 and configured for communication with other components of the endorsement sharing module 156A to control their operation. For example, the sharing request module 250 cooperates with the sharing user interface creation module 252 to generate a user interface (e.g., share box) that includes context metadata, content, and action buttons that the sharing request module 250 can send to the client device 104. The sharing request module 250 may also cooperate with the content and context retrieval module 254 to retrieve content and context information from the other servers 112, 114, 124, 126 and 128. The sharing request module 250 may also receive and process shared content from the client device 104A, for example, when the user has selected the share button in the share box. The received information can be stored in the shared information storage 256 and/or provided to the transfer module 258 to be provided to the other servers 112, 114, 124, 126 and 128.

The sharing user interface (UI) creation module 252 may be software or routines for creating a user interface or share box including recommended content. The sharing UI creation module 252 may generate and provide share boxes, recommended content, context information and action buttons as will be described in more detail with reference to FIGS. 4-6. The sharing UI creation module 252 receives the share box request 220 from the sharing request module 250 or directly from the client device 104A. The sharing UI creation module 252 can provide various combinations of share boxes, recommended content, and action buttons adapted to be responsive to the request received from the sharing client 110A. Example user interfaces are described below in more detail with reference to FIG. 5-6. The sharing UI creation module 252 receives the content and context information from the content and context retrieval module 254 either directly or indirectly from the share request module 250. The sharing UI creation module 252 combines this received content and context information with the user interface constructs and sends a user interface (e.g., share box 226) to the client device 104A. The sharing user interface (UI) creation module 252 is coupled for communication with the client device 104A and the other components of the endorsement sharing module 156A.

The content and context retrieval module 254 may be software or routines for retrieving or generating the content and determining the context for information that is added to the share box. The content and context retrieval module 256 is coupled or configured for communication with the other servers 112, 114, 124, 126 and 128. The content and context retrieval module 254 cooperates with the client device 104A and the one or more servers 112, 114, 124, 126 and 128 to retrieve content that can be processed and potentially sent as recommended content in a share box. For example, the content and context retrieval module 254 generates and sends context request signal 222 and receives 224 content and context information from the other servers 112, 114, 124, 126 and 128. It should be understood that the content and context retrieval module 254 also receives information from the sharing client 110A and indicating the context in which the user submitted the share request 220. For example, if search results were being presented to the user, the sharing client 110A would provide that context information to the content and context retrieval module 254. Similarly, if information from a social network were being presented to the user, the sharing client would provide that context information to the content and context retrieval module 254. Based on the information received from the sharing client 110A, the content and context retrieval module 254 can determine which of the other servers 112, 114, 124, 126 and 128 to send a content request. It should be understood that the content request 222 can include a request for additional context information from the other servers 112, 114, 124, 126 and 128. The content and context retrieval module 254 is coupled for communication with the other components of the endorsement sharing module 156A.

The shared information storage 256 may be data sources or data storage that stores the shared content and context. For example, the shared information storage 256 is used to store information provided by the sharing client 110A in response to user selection of the share button, post button or similar action button. The shared information storage 256 may also be used to store content and context information received from the other servers 112, 114, 124, 126 and 128. The shared information storage 256 may also provide a working memory area for use by the other components of the endorsement sharing module 156A. The shared information storage 256 may be a dynamic random access memory (DRAM) device, a static random access memory (SRAM) device, a flash memory, disk storage or some other memory device.

The transfer module 258 may be software or routines for transferring information provided by the sharing client 110A in response to user selection of the share button, post button or similar action button to the other servers 112, 114, 124, 126 and 128. In some embodiments, the shared information and context is provided to other servers 112, 114, 124, 126 and 128 regardless of whether the context of the client device 104A when the information was shared. In some embodiments, the shared information is provided only to the other servers 112, 114, 124, 126 and 128 corresponding to the context in which the share action was taken by the sharing client 110A. For example, if the share action was taken while the client device 104A was presenting information about social network, the shared content and context information is only provided back to the social network server 124. Similarly, if the share action was taken while the client device 104A was presenting search results, the shared content and context information is only provided back to the search server 114. However, it should be understood that the transfer module 258 could provide the shared content and context information back to sets or groups of other servers 112, 114, 124, 126 and 128 (e.g., providing shared information back to both the search server 114 and the AD server 128).

The updating module 260 may be software or routines for updating the shared content and context information stored in the shared information storage 256. In some embodiments as will be described below, the shared context and content information may be updated as users with whom the information is shared interact with the shared information. For example, a first user may share information using the share box. A second user may review the shared information and interact with it via any of the search server 114 or the social network server 124. When the second user reviews information and interacts with it, the sharing client 110B may update the content and the context (e.g., if a webpage has been updated) and then interact with that updated content. In some cases the updated information will only be stored at the server 112, 114, 124, 126 and 128 with which the second user is interacting. In other embodiments, the updated information is provided back to the endorsement sharing module 156A and stored in the shared information storage 256. In this case, the updating module 260 cooperates with the server 112, 114, 124, 126 and 128 and stores the updated information at the shared information storage 256.

Figure 3:
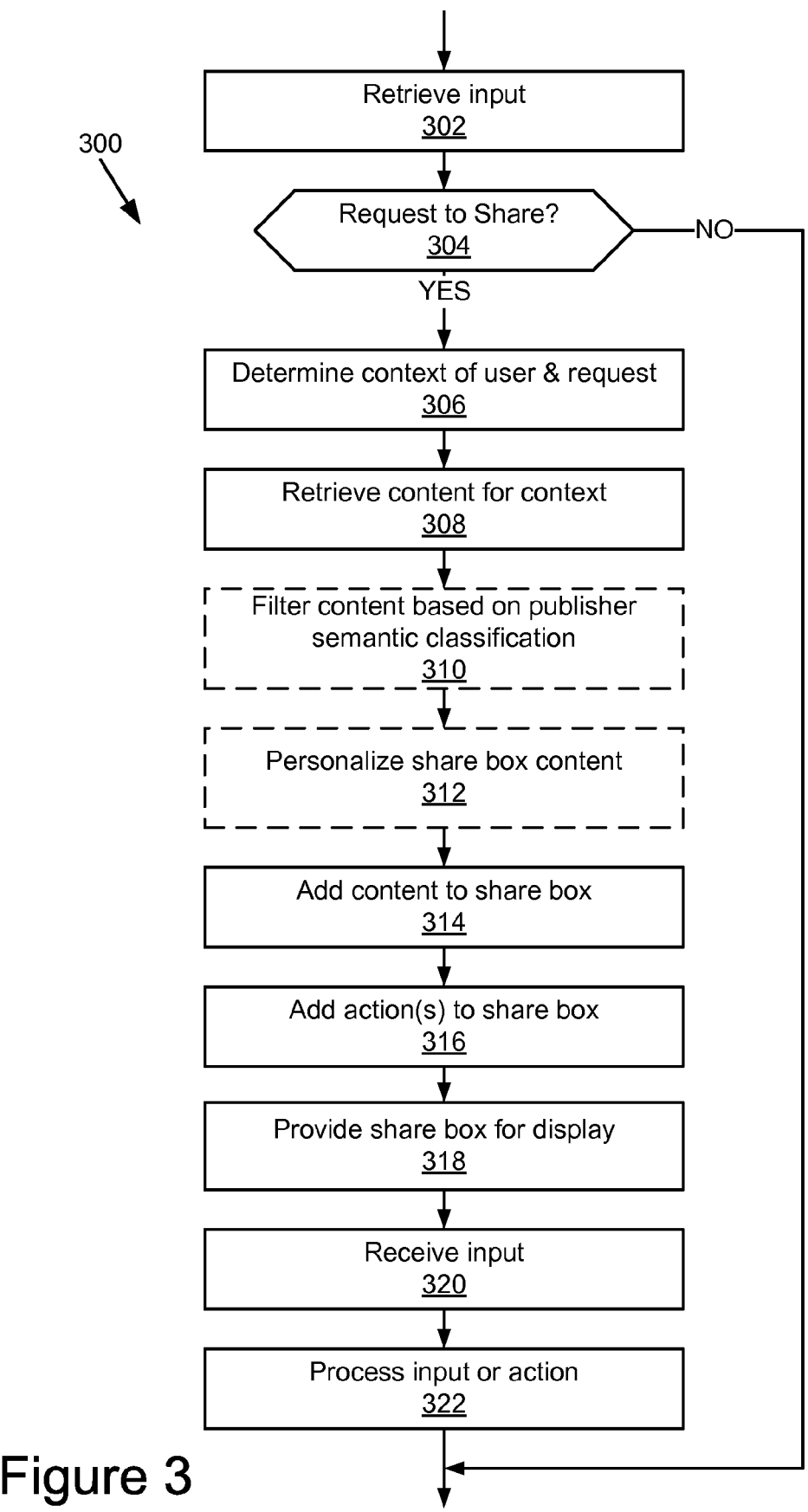
FIG. 3 is a flowchart of a method for presenting a sharing interface according to an embodiment of the present disclosure.

Referring now to FIG. 3, one embodiment of a method 300 for presenting a share box with content information in response to an endorsement is described. While the processes of the present disclosure are described in the context of the share box, it should be understood that these processes are applicable to presentation of any type of user interface and processing of the data input by the user with that interface. The method 300 begins by receiving 302 an input from the user. Depending on the embodiment, the input may be the selection of an endorsement button provided for users of search engines or social networks, for example. The present disclosure will now be described in the context of an endorsement button; however, it should be understood that the share box could also be presented in a similar manner in response to other buttons, for example, a share button. Next the method 300 determines 304 whether the received input was a request to share or endorse. In some embodiments, the input for request to share is selection of the endorsement button, a right-click over the endorsement button, a mouse over the endorsement button, an endorsement action or similar input. It should be recognized that a share input may be associated with any input a user can make from the web browser 202. In some embodiments where the received input was an endorsement action, the method 300 processes the endorsement action (not shown) and generates an endorsement (not shown) then continues to block 306 to continue the generation and population of the share box. In other words, there is a two-step process for generating the share box where the input was an endorsement action as compared with a single step process where the input was a cursor over or right-click of the endorsement button. If the input was not a request to share, the method 300 ends. On the other hand, if the input was a request to share, the method 300 continues to determine 306 the context of the user, the context of the request and/or the identity of user. In other words, the method 300 determines any information that can be used to determine the context in which the share request was made. This context information is used to retrieve and/or filter content for insertion into the share box. For example, determining the context may include determining the webpage being viewed, determining the portion of the web page being viewed, determining information associated with the input, determining input associated with the endorsement button, determining publisher settings for a web page, determining terms associated with a web page or portions of a webpage, etc. In some embodiments, part of this information is used to determine what content should be filtered and not presented in the steps below.

Next, the method 300 retrieves 308 content according to the context in which the request to share was made. For example, if the user is viewing a particular webpage, all or portions of that webpage may be retrieved and are identified for inclusion in the share box. The content may be text, images, video, links to video, or any other information appropriate for sharing. Similarly in another embodiment, since the share request is associated with a particular endorsement button, only the content related to that endorsement button is identified for addition into the share box. In some embodiments, additional content not visible to the user may also be retrieved for possible inclusion in the share box. In some embodiments, certain portions of the webpage are tagged with semantic classifications provided by the publisher. That information can also be used to determine the content that should be retrieved.

Then the method 300 filters 310 the content based on publisher input. It should be recognized that step 310 is optional and show with dashed lines in FIG. 3. In some embodiments, information provided to the user includes additional non-visible or visible tags for semantically classified information that is presented to the user. These tags can include types, properties and values associated with the content. Once the context of the user has been determined and content has been retrieved for that context, this information can be further refined using the semantic classifications provided by the publisher. In some embodiments, the information is filtered by the publisher specifically indicating what information may be copied into the share box. For example, the publisher may restrict content for the share box to be limited to the same domain as the user is currently viewing. In some embodiments, the endorsement sharing module 156 decides what content to filter based on auto crawling or some alternative mechanism. In some embodiments, the information is filtered by a combination of input from the endorsement sharing module 156 and the publisher. It should be understood that there are any number of additional ways in which the content may be filtered based on semantic classification, requirements of the publisher, requirements of the search server 114, or requirements of other related entities.

Next, the method 300 personalizes 312 the content that is to be added to the share box. The content can be personalized based on information from the social network server 124 such as using known attributes of the user, information from friends of the user, information from use of the social network by the user, information from other endorsements made by the user or any other sources. Similarly, the content can be personalized based on information from the search server 114 such as the browsing history of the user. In some embodiments, information from a profile server that includes preferences for the user is used to personalize the content. In any or all of these personalization methods the user is allowed to opt in or opt out of such information being used for personalization. In other words, the method 300 customizes the content that will be added to the share box based on the identity of the user, who he or she is and his/her preferences. Again, it should be recognized that in certain embodiments the personalization step 312 is optional and thus show with dashed lines in FIG. 3.

The method 300 continues by adding 314 the filtered and personalized content to the share box. Next the method 300 adds 316 actions to the share box. For example, depending on the context, the share box may be pushed to any one or more of: 1) third-party sites; 2) a stream of information from the user; 3) a post by the user; 4) a recommendation page of the user; 5) annotation storage for later presentation with the search results; 6) a micro blogging site; and 7) any other site, page, database or system in which the information may be useful and valuable. Individual buttons for actions on the information in the share box are added to the share box. The actions may also include an identification of recipients for the shared content. As will be described below with reference to FIG. 5, the user may choose in field 508 others with which the content is shared. In some embodiments, the sharing box of the present disclosure allows the user to specify an individual with which to share the content, an e-mail address to which to share the content, a group of individuals with which to share the content or a list of e-mail addresses with which to share the content, or other individual identifiers or group identifiers. For example, the user may specify a group of users on a social network to share the content with (e.g., family, friends, coworkers, etc.) In other words, the user can identify or limit the users with which the content is shared. Moreover, in some embodiments an additional action may be added to the share box to notify the identified users. For example, different users or groups specified in the share box may receive an e-mail or other type of notification indicating content has been shared with them. This can be based upon user selection/received input in the share box, for example, an notification option may be presented in response to a user hovering over a recipient identified in the share box. Furthermore, in some embodiments the names of users that are present in a group (e.g., family) can be displayed in response to the user moving the cursor over the group name in the share box. The method 300 continues by providing 318 the share box for display. In one embodiment, the share box is sent from the search server 114 to the client device 104 and the information is presented in a browser 202 at the client device 104. The user can add additional information to the share box and select anyone of the action buttons such that the content in the share box is delivered according to the action selected. The method 300 receives input 320 and then completes by processing 322 the input or action.

Although not shown in FIG. 3, after the share box has been presented or displayed to the user 102, the user can take a number of actions. First, the user can add additional content by inputting it to the share box. For example, this additional content can be text, a post, a photo, video, audio, etc. Second, the user 102 can specify other users or systems with which to share the content in the share box. This can be done following selection of the share button. In some embodiments, the content from the share box can be sent to individuals or other systems. For example, the content in the share box could be e-mailed to a particular user. In another example, the information in the share box may be added to the stream of the user 102 in his/her social network. In yet another example, the content in the share box may be returned to the third party server 126, the search server 114, the endorsement sharing module 156 or any other system for additional processing, analytical evaluation, or presentation. In particular, the ability to easily add content and share with a multitude of other users and systems allows the user to spread content in a viral manner.

Figure 4:
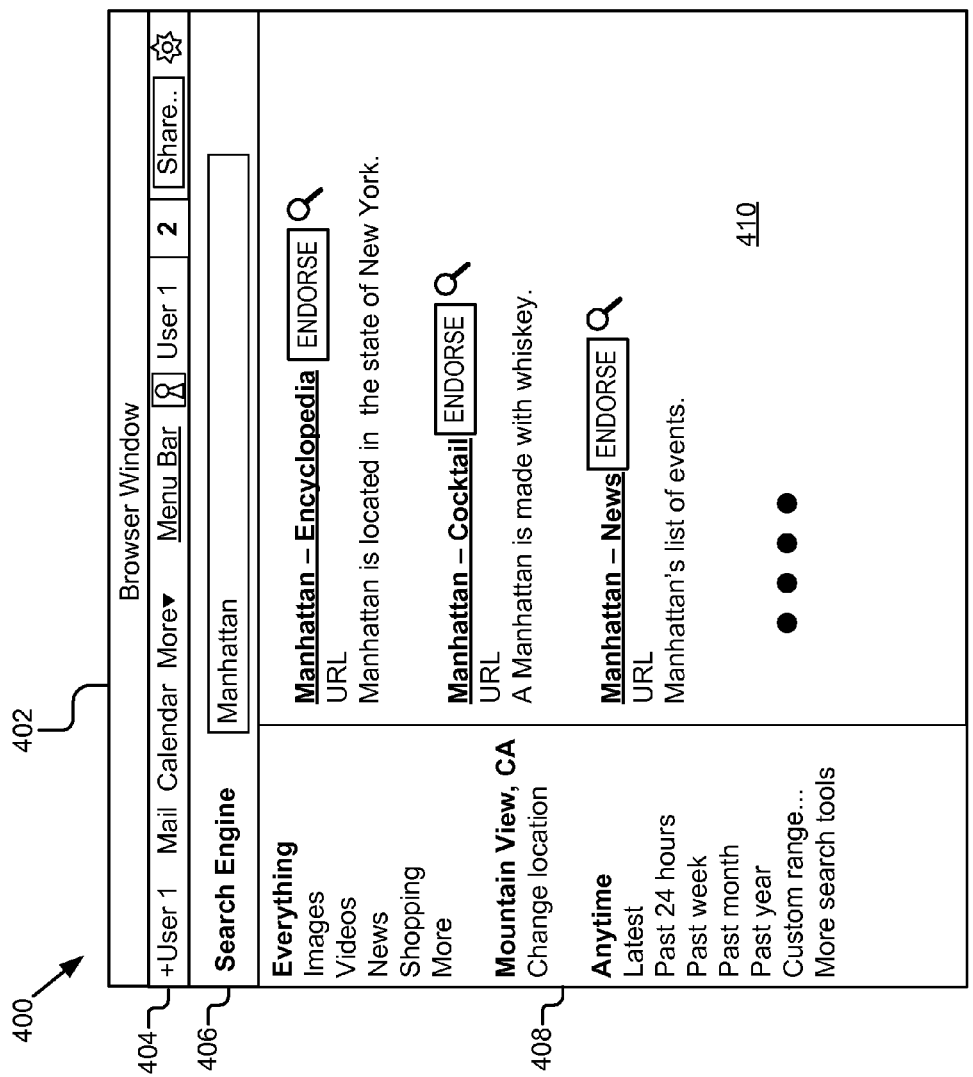
FIGS. 4-6 are graphic representations of examples of user interfaces for presenting a share box according to some embodiments of the present disclosure.
Figure 5:
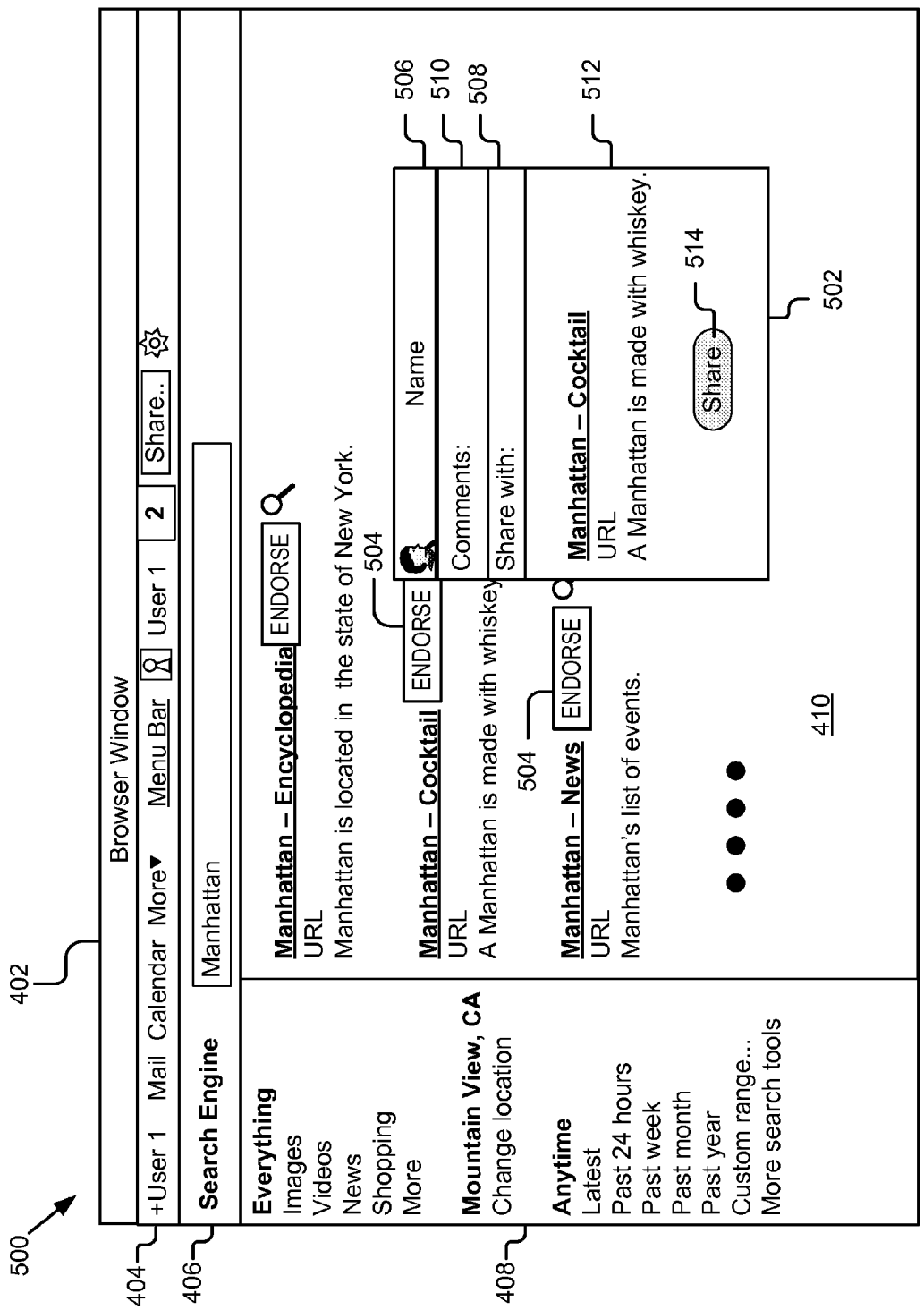
Figure 6:
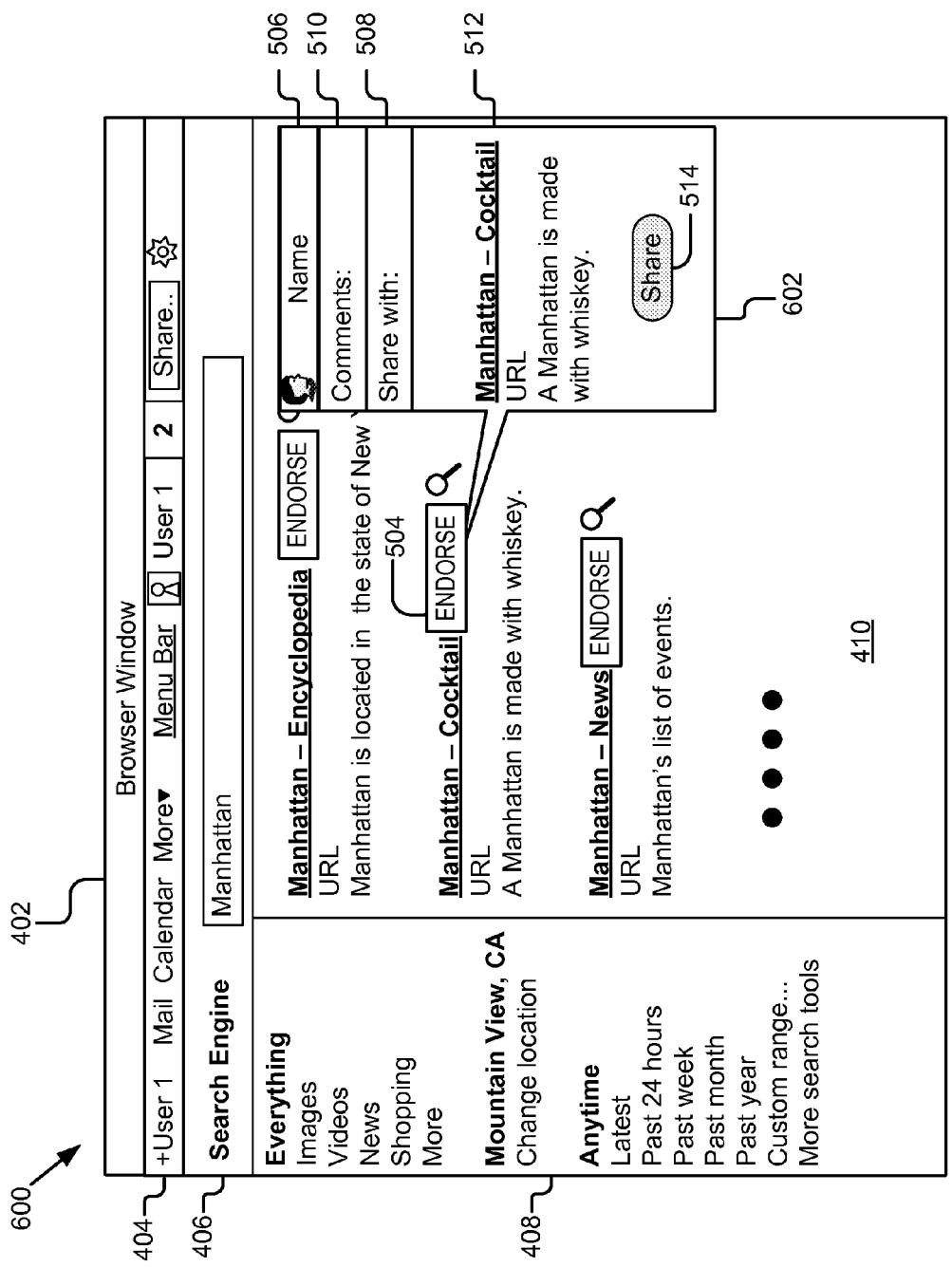

Referring now to FIGS. 4-6, some embodiments for presenting the share box 502, 602, in particular with relationship to search results are shown. It should be understood that the share box 502, 602 may be provided with other information such as social network information from the stream, video information or various other contexts. FIG. 4 illustrates one embodiment of a user interface 400 in which search results for the term "Manhattan" are shown in a browser window 402. In this example, numerous search results are returned in response to a query for the term "Manhattan" and the top three search results are shown. The user interface 400 includes a browser window 402 having a number of components including a top label, a menu bar 404, a bar 406 for a search engine and input box, a side/location bar 408, and a display area 410. The top labels, the menu bar 404, the side/location bar 408 and the display area 410 have a conventional functionality. For example, the menu bar 404 provides menus to access browser functionality. It should be recognized that the embodiment shown in FIG. 4 is only one example for the user interface. The browser window 402 could just as easily include content from a publisher page that includes at least one endorsement button similar to the button shown in FIGS. 4-6.

This embodiment of the user interface 500 also includes a share box 502 that is displayed once the user has input a request to share such as selecting the endorsement button 504. The share box 502 also includes a plurality of labels and fields 506, 508, 510, 512 and 514. The top of the share box 502 includes a box 506 for presentation of the user's name and photo to identify the person that will be sharing the information. In some cases, rather than the user's real name, this may be a handle or other login name used by the individual. A second box 510 allows the user to add any comments that will be associated with the content in the share box. A third box 508 provides an area in which the user 102 can select or specify who the content of the share box will be provided. In one embodiment, the name or other identifying information for individual users can be input into the third box 508. In another embodiment, groups or circles with which the information the share box will be shared can be selected from the third box 508. Area 512 includes information/content that has been retrieved based on the context of the user as described above with reference to FIG. 3. In this example, the abstract that the user saw on the webpage results is copied into the display area 512. It should be understood that the information from the webpage is filtered or personalized based on the context and the user identity. In some embodiments, the display area 512 includes a scrollbar or button (not shown) that is presented in response to the user moving the cursor over the information/content or some other input. In response to selection of the scrollbar or button, other alternative information or content is displayed in place of the original information/content. For example, if the webpage being referenced includes a number of images (e.g., image one, image two, image three, image four and image five image) and the method 300 automatically selects and presents image two in the display area 512, selection of the scrollbar causes and allows manual selection by the user of one of the others images to be presented in the display area 512. This provides the user with the ability to easily select the content that will be shared when the share button is selected. It should be understood that this selection process applies to text, links, video, etc. and not just images. In another embodiment, the second box 510 for comments is omitted, and the user can directly edit the content in the display area 512 to modify content that was automatically copied into the display area 512. Finally, the display area 512 includes one or more buttons 514 which when selected by the user take action with regard to the content in the display area 512 of the share box 502. In the embodiment shown in FIG. 5, the user has only the ability to share the content in his/her social network stream. However, any number of actions as described above with reference to FIG. 3 can be taken using the share box 502, and additional buttons similar to 514 can be provided for each separate action that can be taken with regard to the content.

FIG. 6 illustrates a second embodiment of the user interface 600 in which the share box 602 is provided upon hover over the endorsement button 504. This share box 602 is similar to that described above with reference to FIG. 5 and includes a name and photo header 506, a comments box 510, a box 508 for the user to input who the content should be shared with and a display area 512 and a button 514. It should be appreciated that FIGS. 5 and 6 are merely example embodiments of the present disclosure. There are many other embodiments of the present disclosure having the same but fewer or more elements than shown in FIGS. 5 and 6. The operation of the above system 100 and method 300 can be better understood with reference to an illustrative example. For example, a user 102A may interact with the client device 104A by inputting search terms and receiving search results from the search server 114. The search results are displayed on the client device 104A to the user 102A. The user interacts with the search results and generates a search box request 220. The search box request 220 is received by the endorsement sharing module 156A, in particular the sharing request module 250. In response, the sharing request module 250 cooperates with the sharing client 110A to determine the context in which the information was being viewed by the user 102A. In this example, the context comes in the form of a uniform resource locator (URL) for the page being displayed by the client 104A. In some embodiments, the context may be a representation of the portion of the page being displayed, a snippet of an ad, a URL to one of the search results being displayed etc. In other words, the content that will be provided in the share box is related to or includes the URL being shared. As noted above, the sharing user interface creation module 252 creates a user interface, a share box. The content and context retrieval module 254 cooperates with the sharing request module 250 to generate the content that will be inserted into the share box. In one embodiment, the content and context retrieval module 254 cooperates with the search server 114 to fetch the page presented to the user on the client device 104A. More specifically, an endorsement button may be associated with a particular URL or webpage. The content and context retrieval module 254 cooperates with the client device 104 to determine the endorsement button selected and its corresponding URL. The webpage corresponding to the URL is then retrieved and the content and context retrieval module 254 reviews the retrieved page and determines the appropriate content to add to the share box. In some embodiments, the publisher of the webpage provides indications or definitions of what should be shown and how it should be rendered. For example, these attributes and values set forth by the publisher are used to control the content that is provided in the share box. Example attributes and values include type, property, format, size, position, etc. In some embodiments, the content of the share box is pre-populated and controlled by the type of item represented by the publisher in the presence of properly formatted values. In some embodiments, other algorithms that consider other factors such as leading text or sidebar, font size small or large, position, snipping techniques by search engines, etc. this are used to determine the content for the share box. As noted above, in some embodiments, the content and context retrieval module 254 reviews data fetched by the user, type of content, by friends of the user, other content the user has shared, third content the user has endorsed, frequency at which the user has shared, endorsed or reviewed this type of content, and various other social, search or endorsement factors or signals to determine the content to include in the share box. This content and appropriate action buttons for the content are added to the share box. The share box with these additions is then provided to the client device 104A for display to the user. The user can then take action with regard to the shared content using the share box by sharing the content, adding additional content and sharing the content, specifying the manner in which the content will be shared or closing the share box with no further action. In response to the user's input, the endorsement sharing module 156A performs one of these actions.

Figure 7:
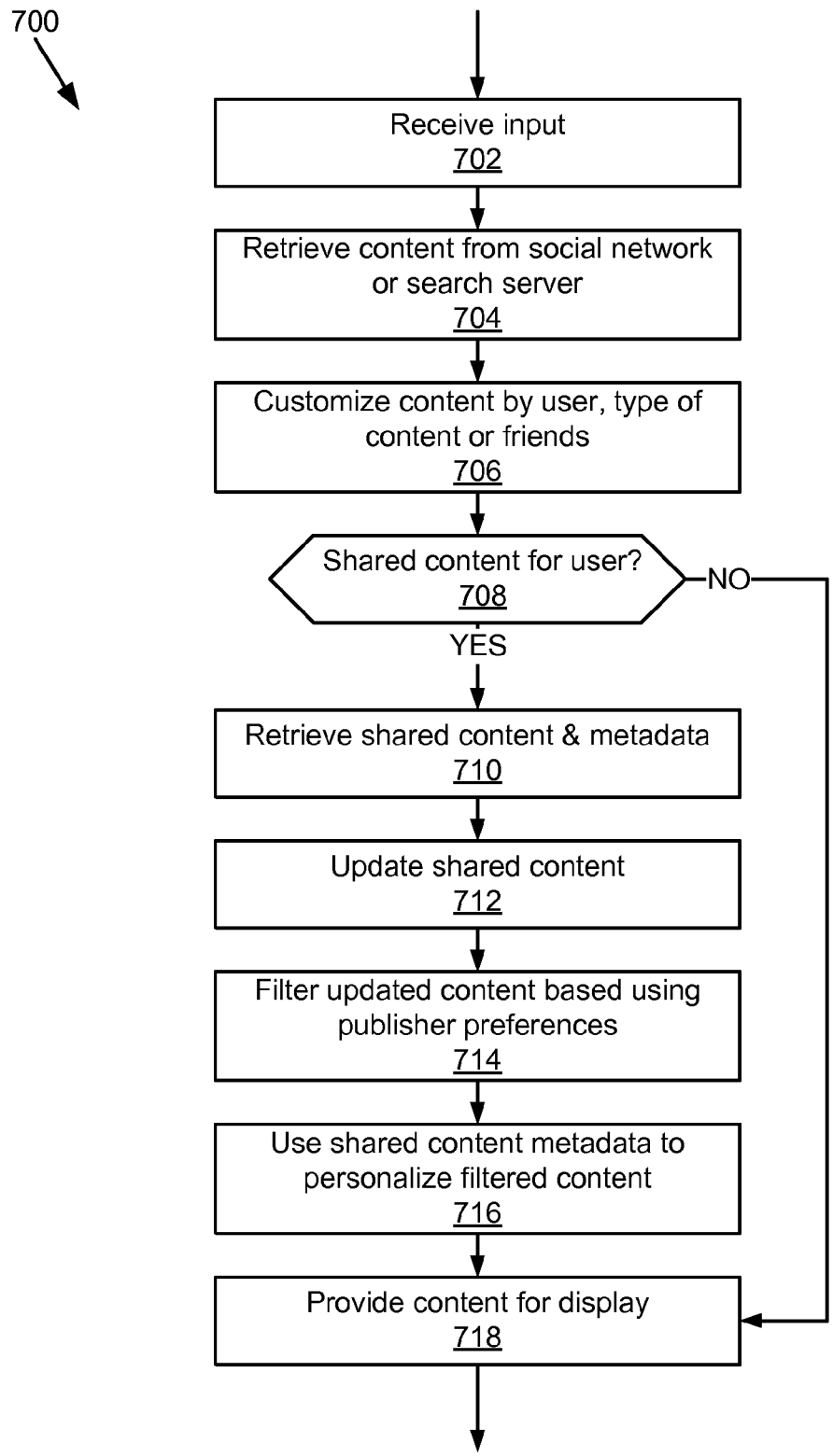
FIG. 7 is a flowchart of a method for providing shared content according to an embodiment of the present disclosure.

Referring now to FIG. 7, one embodiment of a method 700 for providing shared content according to the present disclosure will be described. This 700 method is representative of a method for a user to interact with content and automatically retrieve shared content and is described in the context of reviewing search results. However, it should be understood that similar methods with similar functionality can be applied to situations where users interact with shared content using the client device 104B and other servers for example the endorsement server 112, the social network server 124 or the search server 114. The method 700 begins by receiving 702 input from the client device 104. This could be a request for search results or a request to retrieve content from a social network. The method 700 then retrieves 704 content from the search server 114 or the social network server 124. The retrieved content can then be customized 706 by user, type of content, or content indicated to be interesting by friends. Next, the method 700 determines 708 whether any of the customized content includes shared content that was produced as the result of a share action from the share box or similar sharing action from a sharing interface. If not, customized content is provided 718 for display. However, if there is shared content that is included in the customized content generated in block 706, the method 710 retrieves the shared content, the context in which the content was shared or any associated metadata. Next, the method 700 updates 712 the shared content. For example, if the shared content includes abstract of text and a URL, the webpage corresponding to the URL is retrieved and the abstract of text is updated. In some embodiments, this is similar to performing blocks 306 and 308 of FIG. 3. The updated shared content is then used in place of the shared content. The method 700 continues by filtering 714 the updated content using publisher preferences. In some embodiments, the method filters 714 both the customized content block 706 and the updated shared content of block 712. The method 700 continues by personalizing 716 the filtered content using the shared content metadata. In some embodiments, the customized content of block 706 is also personalized. In some embodiments, other information from other servers can be used to personalize the content similar to block 312 described above with reference to FIG. 3. The method 700 completes by providing 718 the content for display. For example, the personalized shared content and the customized content can be combined and presented to the user on the client device 104B. The use of the shared content in this manner is particularly advantageous because the shared data can be updated to reflect the current state of the URL from which it was derived. The above method is also advantageous because the shared information by a friend of the user or other person having a relationship to the user is used to increase the likelihood that information displayed will be relevant to the user.

A system for presenting a sharing interface or share box with content information in response to an endorsement has been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in one embodiment below with reference to user interfaces and particular hardware. Moreover, the technologies disclosed above primarily in the context of a social network; however, the disclosed technologies apply to other data sources and other data types (e.g., collections of other resources such as images, audio, web pages) that can be used to refine the search process.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
receiving input from a first user, the received input associated with published content on a webpage;
determining a context of the first user and based on the input the published content;
retrieving content and context from a plurality of web site servers hosting a plurality of different websites, wherein the context is used to determine (1) what information is added to a sharing interface and (2) which one of the plurality of different websites will the sharing interface be pushed to, the context including information about the webpage based on the determined context;
generating customized content by processing the retrieved content based on the determined context;
receiving and processing a request for the sharing interface;
providing the sharing interface including the customized content using the context and an endorsement;
adding the retrieved content based on the context to the sharing interface, the sharing interface overlaid on a portion of the webpage and including at least one area for displaying the retrieved content and receiving the customized content, the at least one area for displaying the retrieved content and receiving customized content allowing for additional input of information into the sharing interface including input of comments and at least one user identifier associated with a second user, the second user an intended recipient of the customized content;
adding an action button to the sharing interface;
sending the sharing interface for display;
transferring the customized content in the sharing interface based on the context in response to user selection of the action button; and
sending the customized content to the second user associated with the at least one user identifier.

2. The method of claim 1, wherein the input is a selection of an endorsement button, a cursor over the endorsement button or an endorsement action.

3. The method of claim 1, wherein determining a context of the first user and the input includes determining a uniform resource locator corresponding to an endorsement button.

4. The method of claim 1 further comprising:
receiving additional input from the first user;
determining an action associated with the additional input; and
performing the action associated with the additional input on the content in the sharing interface.

5. The method of claim 4 wherein the additional input is a selection of the action button and the action is sharing the added content.

6. The method of claim 1 further comprising filtering the content based at least in part on a publisher input.

7. The method of claim 5 wherein the publisher input is a semantic classification including a type and a property.

8. The method of claim 1 further comprising personalizing the content based at least in part on user identity.

9. The method of claim 1 wherein adding the action to the sharing interface includes adding a field to input recipients of a sharing action.

10. The method of claim 1 further comprising receiving additional content for the sharing interface and sharing the additional content and the content added to the sharing interface.

11. A system comprising:
a processor, and;
a memory storing instructions that, when executed, cause the system to:
receive input from a first user, the received input associated with published content on a webpage;
determine a context of the first user based on the input associated with the published content;
retrieve content and context from a plurality of website servers hosing a plurality of different websites, wherein the context is used to determine (1) what information is added to a sharing interface and (2) which one of the plurality of different websites will the sharing interface be pushed to, the context including information about the webpage based on the determined context;
generate customized content by processing the retrieved content based on the determined context;
receive and process a request for the sharing interface;
provide the sharing interface including the customized content using the context and an endorsement;
add the retrieved content based on the context to the sharing interface, the sharing interface overlaid on a portion of the webpage and including at least one area for displaying the retrieved content and receiving the customized content, the at least one area for displaying the retrieved content and receiving customized content allowing for additional input of information into the sharing interface including input of comments and at least one user identifier associated with a second user, the second user an intended recipient of the customized content;
add an action button to the sharing interface;
send the sharing interface for display;
transfer the customized content in the sharing interface based on the context in response to user selection of the action button; and
send the customized content to the second user associated with the at least one user identifier.

12. The system of claim 11 wherein the input is a selection of an endorsement button, a cursor over the endorsement button or an endorsement action.

13. The system of claim 11, wherein the memory also stores instructions that, when executed, cause the system to determine a uniform resource locator corresponding to an endorsement button.

14. The system of claim 11, wherein the memory also stores instructions that, when executed, cause the system to:
receive additional input from the first user;
determine an action associated with the additional input; and
perform the action associated with the additional input on the content in the sharing interface.

15. The system of claim 11, wherein the memory also stores instructions that, when executed, cause the system to filter the content based at least in part on a publisher input.

16. The system of claim 15, wherein the publisher input is a semantic classification including a type and a property.

17. The system of claim 11, wherein the memory also stores instructions that, when executed, cause the system to personalize the content based at least in part on user identity.

18. The system of claim 11 wherein the addition of the action to the sharing interface includes an addition of a field to input recipients of a sharing action.

19. The system of claim 11 wherein the memory also stores instructions that, when executed, cause the system to receive additional content for the sharing interface and share the additional content and the content added to the sharing interface.

20. A computer program product comprising a non-transitory computer useable medium including a computer readable program, wherein the computer readable program when executed on a computer causes the computer to:

receive input from a first user, the received input associated with published content on a webpage;

determine a context of the first user based on the input associated with the published content;

retrieve content and context from a plurality of web site servers hosing a plurality of different websites, wherein the context is used to determine (1) what information is added to a sharing interface and (2) which one of the plurality of different websites will the sharing interface be pushed to, the context including information about the webpage based on the determined context;

generate customized content by processing the retrieved content based on the determined context;

receive and process a request for the sharing interface;

provide the sharing interface including the customized content using the context and an endorsement;

add the retrieved content based on the context to the sharing interface, the sharing interface overlaid on a portion of the webpage and including at least one area for displaying the retrieved content and receiving the customized content, the at least one area for displaying the retrieved content and receiving customized content allowing for additional input of information into the sharing interface including input of comments and at least one user identifier associated with a second user, the second user an intended recipient of the customized content;

add an action button to the sharing interface;

send the sharing interface for display;

transfer the customized content in the sharing interface based on the context in response to user selection of the action button; and send the customized content to the second user associated with the at least one user identifier.

21. The computer program product of claim 20 wherein the user input is a search query and the published content is at least one search result.

22. The computer program product of claim 20 wherein the user input is a user input on a social network portal of the second user and the published content is content published on a social network portal of the second user.

* * * * *